United States Patent
Hertlein et al.

(10) Patent No.: US 12,304,449 B2
(45) Date of Patent: May 20, 2025

(54) METHOD OF OPTIMIZING METERABILITY OF BRAKE FORCE IN ABS BRAKING

(71) Applicant: Dr. Ing. h.c. F. Porsche Aktiengesellschaft, Stuttgart (DE)

(72) Inventors: Günther Hertlein, Kirchberg (DE); Bernhard Schweizer, Eutingen-Rohrdorf (DE); Michael Kurz, Pliezhausen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 146 days.

(21) Appl. No.: 18/223,610

(22) Filed: Jul. 19, 2023

(65) Prior Publication Data
US 2024/0075914 A1  Mar. 7, 2024

(30) Foreign Application Priority Data
Sep. 6, 2022  (DE) ............ 10 2022 122 523.2

(51) Int. Cl.
*B60T 8/176*  (2006.01)
*B60T 8/40*  (2006.01)
(Continued)

(52) U.S. Cl.
CPC ............ *B60T 8/176* (2013.01); *B60T 8/4081* (2013.01); *B60T 17/22* (2013.01); *B60Q 5/005* (2013.01);
(Continued)

(58) Field of Classification Search
CPC ........ B60T 8/176; B60T 8/4081; B60T 17/22; B60T 2220/04; B60T 2270/10;
(Continued)

(56) References Cited

U.S. PATENT DOCUMENTS

| 6,345,871 B1 | 2/2002 | Harris et al. |
| 10,800,389 B2 | 10/2020 | Bauer et al. |

(Continued)

FOREIGN PATENT DOCUMENTS

| DE | 10124591 A1 | 1/2002 |
| DE | 112019003327 T5 | 4/2021 |

OTHER PUBLICATIONS

Great Britain Combined Search and Examination Report for Application No. GB2311438.2, dated Jan. 10, 2024, 5 pages.

*Primary Examiner* — Xiao En Mo
(74) *Attorney, Agent, or Firm* — Buchanan Ingersoll & Rooney PC (57) ABSTRACT

A method for optimizing the meterability of brake force in an ABS braking with a brake-by-wire brake system. The method includes various steps. First, a driver brake request is sensed by a pedal force simulator. In addition, a trigger point (A) of an ABS braking is recognized. In the case of a recognized ABS braking, there is a correction of the sensed driver brake request such that, upon recognizing the trigger point (A) during a reduction of the sensed driver brake request, the corrected driver brake request is reduced to the extent that ABS braking is no longer present. The corrected driver brake request is subsequently implemented by building up a corresponding brake pressure in a brake device of the brake system.

10 Claims, 4 Drawing Sheets

(51) Int. Cl.
  *B60T 17/22* (2006.01)
  *B60Q 5/00* (2006.01)
  *B60Q 9/00* (2006.01)

(52) U.S. Cl.
  CPC ............. *B60Q 9/00* (2013.01); *B60T 2220/04* (2013.01); *B60T 2270/10* (2013.01); *B60T 2270/82* (2013.01)

(58) Field of Classification Search
  CPC .... B60T 2270/82; B60T 7/042; B60T 13/662; B60T 8/326; B60Q 5/005; B60Q 9/00
  See application file for complete search history.

(56) References Cited

U.S. PATENT DOCUMENTS

| | | | |
|---|---|---|---|
| 2013/0119752 A1* | 5/2013 | Roll | B60T 8/326 303/189 |
| 2015/0197229 A1 | 7/2015 | Knechtges et al. | |
| 2016/0152219 A1 | 6/2016 | Besier et al. | |
| 2017/0282876 A1 | 10/2017 | Oosawa et al. | |
| 2018/0229702 A1 | 8/2018 | Son et al. | |
| 2020/0070792 A1 | 3/2020 | Bauer et al. | |

* cited by examiner

Fig. 1a

Prior art

Fig. 1b

Prior art

Fig. 2a

Prior art

Fig. 2b

Prior art

METHOD OF OPTIMIZING METERABILITY OF BRAKE FORCE IN ABS BRAKING

CROSS-REFERENCE TO RELATED APPLICATION

This application claims priority to German Patent Application No. 10 2022 122 523.2, filed Sep. 6, 2022, the content of such application being incorporated by reference herein in its entirety.

FIELD OF THE INVENTION

The present invention relates to a method and a computer-implemented method for optimizing the meterability of the brake force in an ABS braking with a brake-by-wire brake system of a motor vehicle.

SUMMARY OF THE INVENTION

A brake system of a motor vehicle in which the brake pedal is mechanically and hydraulically decoupled from a brake device that generates the actual brake pressure is referred to as a brake-by-wire brake system. The brake request by the driver, which he expresses by actuating a brake pedal, is usually received by a hydraulic brake simulator by means of a pedal sensor and converted into an electrical signal. Using the signal, the brake pressure is generated by a separate hydraulic system. Such systems are therefore also referred to as external force systems.

These brake systems typically have only the communication direction from the brake pedal to the braking apparatus. Therefore, information cannot be transmitted from the braking apparatus to the brake pedal and thus to the driver. In conventional systems, i.e., brake systems that work with a classical brake force intensifier (that is, not brake-by-wire systems), dependent upon the technology used, feedback to the brake pedal in the form of a vibration/pulsing of the pedal is given to the driver when the anti-blocking system engages in the braking (anti-lock braking). On the basis of this information, the driver can adjust his driving style to the road conditions.

Figure 1A:
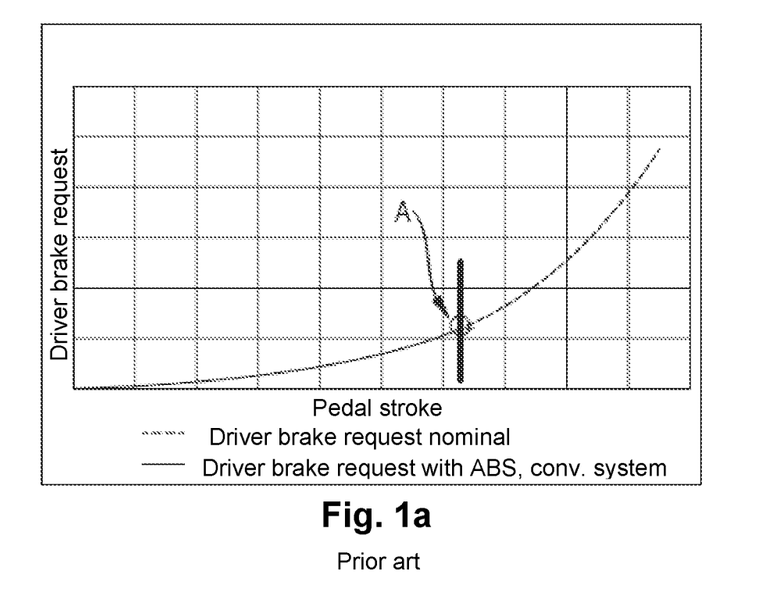
FIG. 1a a diagram illustrating a characteristic curve between the driver brake request and the pedal stroke in a conventional brake system using a method according to the prior art.

FIG. 1a is a diagram illustrating a driver brake request via a sensed pedal stroke in a conventional brake system. The pedal stroke describes the deviation of the brake pedal from the zero position. The zero position is the position of the brake pedal when no force is acting on the pedal. As shown, at the beginning of the pedal stroke, the driver must increase it comparatively greatly in order to increase a driver brake request. Towards the end of the entire available pedal stroke, however, a slight increase in the pedal stroke is already sufficient to pass an equal increase in the driver brake request to the brake system. The driver brake request thus increases exponentially with increasing pedal stroke.

Figure 1B:
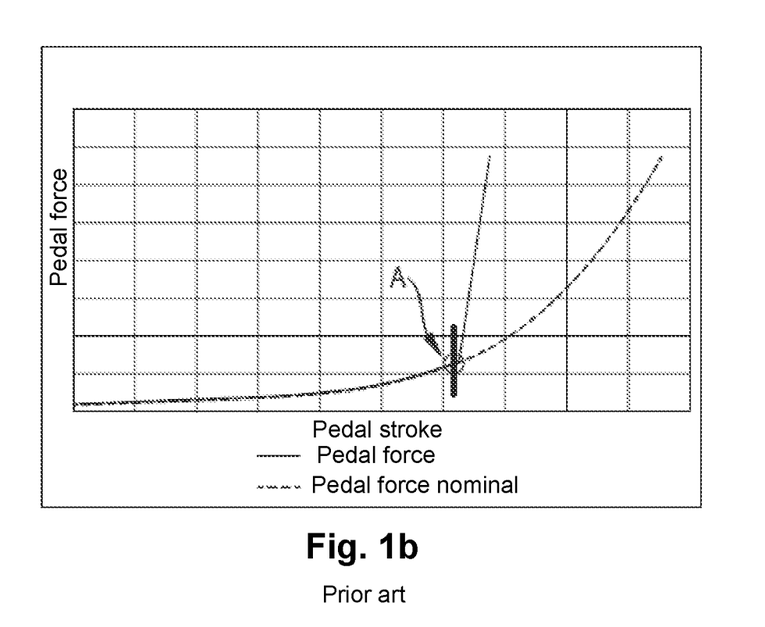
FIG. 1B a diagram illustrating a characteristic curve between the pedal force and the pedal stroke in a conventional brake system using a method according to the prior art.

FIG. 1B is a graph illustrating pedal force across the sensed pedal stroke of a conventional brake system. It can be seen in this case that the pedal force also increases as the pedal stroke increases. Thus, the driver will need to apply more force during stronger braking in order to further increase the pedal stroke to thereby express an increased driver brake request. However, in case of a large pedal stroke, a small change is already sufficient to transmit a clear increase in the driver brake request to the brake system (see FIG. 1a).

The nominal curves (dashed lines) of the driver brake request (FIG. 1a) as well as the pedal force (FIG. 1B) indicate the theoretical curves that would be traversed if there were always optimal transmission of force between the wheels and the roadway. They are used as characteristic curves between driver brake request and pedal stroke and pedal force and pedal stroke. That is to say, a certain position of the pedal is associated with a certain pedal force that is necessary to hold the pedal in that position. Likewise, a position of the pedal is associated with a fixed driver brake request. In practice, however, the brake force at some time exceeds the force that can be transferred via the wheels to the roadway, thereby blocking the wheels. To prevent this, the anti-blocking system known in the prior art has been used for many years, which prevents the wheels from being blocked and thus improves braking, in particular in difficult traction conditions.

The depicted trigger point A in FIGS. 1a and 1b denotes the point at which an ABS braking is used. From this point on, the pedal force to be applied increases in a system-based manner, so that an increase in the pedal stroke and thus the expression of an increased driver brake request becomes impossible. Thus, the operating point is automatically retained at the start of the ABS control, for which reason the driver can selectively modulate his driver brake request below the trigger point A from this point on so that no ABS braking takes place at the moment. This can be required in particular in motor sports while driving on the race track, in order to selectively reduce the brake force, e.g., when steering into the curve.

Due to the lack of feedback in brake-by-wire brake systems, the driver is not able to find trigger point A in an ABS braking in order to thus modulate his brake request around this point or slightly below. This is explained in further detail with reference to FIGS. 2a and 2b.

Analogously to FIGS. 1a and 1b, these show the driver brake request (FIG. 2a) and the required pedal force (FIG. 2b) over the pedal stroke. Brake-by-wire brake systems have, as can be seen, a characteristic curve of the driver brake request and pedal force modeled according to the conventional brake systems. Thus, with a low pedal stroke, a low pedal force is required to increase the driver brake request by a small amount. In the case of large pedal strokes, a large pedal force is in turn required in order to increase the pedal stroke and thus to increase the driver brake request by already increasing the pedal stroke considerably. A position of the pedal is thereby associated with a particular pedal force and a driver brake request.

Again, trigger point A denotes the occurrence of an ABS braking. However, in brake-by-wire brake systems, pedal force does not increase abruptly with the triggering of ABS braking, as is the case with conventional systems (see FIG. 1B). This allows the driver to clearly cross the trigger point A, as indicated by a first pedal position 11 and a second pedal position 12. If the driver now wishes to set the brake request shortly below the trigger point A, in order to reduce the brake force, he must first find the trigger point A, in order to then be able to modulate the brake force correspondingly as in a conventional brake system.

However, locating trigger point A is virtually impossible due to the lack of feedback in brake-by-wire brake systems. Even in the case of acoustic feedback to the driver that an ABS braking has been used, for example, the driver would have to shorten the pedal stroke until the feedback ceases again, but this is not practical in a real-world situation in motor sports in which the response must occur in fractions of a second. Fine metering of the driver's request as in conventional brake systems just below the trigger point A of the ABS control is thus excluded. This can result in the disadvantage that braking performance can be metered more poorly and thus can result in a slower lap time.

A problem addressed by the present invention is thus to provide a braking method and a computer-implemented method that eliminates the aforementioned disadvantages and optimizes the meterability of the brake force.

In the method according to aspects of the invention for optimizing the meterability of the brake force in an ABS braking with a brake-by-wire brake system, a first step is to sense a driver brake request by means of a pedal force simulator. This step preferably occurs by means of a pedal sensor configured so as to measure a pedal force, pedal stroke, and/or pedal angle. The pedal force describes the force applied by the driver to the brake pedal. The pedal stroke describes the path by which the pedal is deflected from its zero position by the actuation of the driver. The zero position of the pedal is the position the pedal occupies when no force is exerted on it by the driver. Based on one or more of the specified parameters, the driver brake request can be sensed based on a defined characteristic curve. The sensing of the driver brake request is carried out permanently and continuously so that a sensed driver brake request can be indicated at any time in the method.

In a further method step, a trigger point of an ABS braking is sensed. The determination of this trigger point of an ABS braking has been known in the prior art since the development of ABS systems, therefore, it is not discussed further at this point. If the trigger point is exceeded so that an ABS braking is present, according to the present invention, the driver brake request is corrected in accordance with a reduction of the sensed driver brake request such that no ABS braking is present. In other words, if, during ABS braking, the brake system recognizes that the driver reduces the driver brake request, i.e., releases the brake lightly by reducing the pedal stroke, the corrected driver brake request is automatically reduced such that there is no ABS braking at the moment. In particular, the corrected driver brake request is reduced to the extent that it is "lower" than the driver brake request that existed when the ABS braking was triggered, i.e., at the trigger point.

Furthermore, the corrected driver brake request is implemented by building up a corresponding brake pressure in a brake device of the brake system in order to thus reduce the speed of the vehicle.

By correcting the sensed driver brake request upon recognition of the release of the brake pedal in such a way that there is no ABS braking at the moment, it can be ensured that no matter how far the driver has crossed the trigger point when entering the ABS control, i.e., independently of the pedal stroke, he can find the trigger point directly again and thus modulate his brake request slightly below the trigger point. For example, the driver can thus specifically and without effort reliably exit the ABS control for a turn drive and still relay the maximum driver brake request to the brake system without the intervention of the ABS. Thus, metering of the brake force around the ABS trigger point can be significantly simplified and optimized.

In an advantageous embodiment of the invention, the reduction of the corrected driver brake request occurs after the reduction of the sensed driver brake request, i.e., after the driver partially releases the brake, in an ABS braking (i.e., after the trigger point) to the same extent as the reduction of the driver brake request would occur starting from the trigger point. In other words, when the driver at least partially releases the brake during an ABS braking, the characteristic curve between the pedal stroke and the driver brake request is briefly shifted by the difference in the pedal stroke between the actual pedal stroke and the pedal stroke at the trigger point. Thus, when releasing the braking, the driver has the same impact on brake pressure as when releasing the braking starting from the trigger point of the ABS braking. The shifted characteristic curve is preferably maintained until the driver at least briefly places the brake pedal in the zero position.

Advantageously, this embodiment is particularly advantageous when the difference between corrected driver brake request and sensed driver brake request is reduced upon further reduction of the pedal stroke and is in particular equal to zero in the zero position of the brake pedal. In this case, the shifted characteristic curve will conform to the nominal characteristic curve upon further reduction of the pedal stroke until it is again on the nominal characteristic curve in the zero position of the pedal.

In an advantageous embodiment of the invention, the correction of the sensed driver brake request is carried out such that, after recognizing the trigger point, the corrected driver brake request is not increased via the sensed driver brake request at the trigger point. Transmitting to the characteristic curve between the driver brake request and the pedal stroke means that an ABS plateau is set in the curve of the driver brake request during the ABS braking.

In a further advantageous embodiment of the invention, the correction of the sensed driver brake request in an ABS braking is carried out after the detection of a certain, i.e., defined, limit pedal stroke such that the difference between the sensed driver brake request and the corrected driver brake request decreases with a further increasing limit pedal stroke, and in particular the difference in a maximum pedal stroke is equal to zero. The limit pedal stroke is defined by a predetermined position of the pedal, wherein the pedal has traveled a certain pedal stroke from zero upon reaching that position. When this limit pedal stroke is exceeded, the difference between the sensed driver brake request, which is the result of the nominal characteristic curve between the driver brake request and the pedal stroke at a certain position of the brake pedal (a certain pedal stroke), and the corrected driver brake request, is to be reduced. That is to say, the corrected driver brake request exits the ABS plateau and approaches the nominal characteristic curve again with increasing pedal stroke and, in particular, when, upon reaching the maximum pedal stroke, i.e., the maximum deviation of the brake pedal from the zero position, the difference between the sensed driver request and corrected driver request is equal to zero.

In an alternative embodiment, the difference between sensed driver brake request and corrected driver brake request decreases as the pedal stroke increases when a pedal stroke is calculated to have a certain difference between sensed and corrected driver brake request. In other words, if the difference between the sensed driver brake request of the theoretical characteristic curve and the ABS plateau of the corrected driver request is too large, the sensed driver brake request is corrected as the pedal stroke increases in such a way that the ABS plateau is exited and the curve of the corrected driver brake request approximates the nominal characteristic curve.

Such an embodiment is particularly preferred when, with a sensed maximum pedal stroke, the corrected driver brake request corresponds to the sensed driver brake request, i.e., the difference between the sensed and corrected driver request is zero.

By decreasing the difference between sensed and corrected brake requests, in particular down to zero at the maximum pedal stroke, it is ensured that the maximum delay is achieved during emergency braking.

In a preferred embodiment of the invention, upon recognition of the trigger point, the brake pedal is vibrated by means of a dedicated, in particular mechanical actuator. The vibration can provide haptic feedback to the driver, who thus recognizes that the ABS braking is occurring. Alternatively or additionally, another at least optical or acoustic feedback is provided to the driver regarding the use of the ABS system. By providing haptic, optical, and/or audible feedback, the driver can further be provided with the information that the brake system is executing an ABS braking, making it easier for the driver to adjust his driving style to the appropriate weather conditions and traction conditions of the roadway. In addition, in the form of haptic and/or acoustic feedback, a type of feedback known to the driver from conventional brake systems can be provided.

The computer-implemented method according to aspects of the invention for optimizing the meterability of the brake force in an ABS braking with a brake-by-wire system comprises the method steps according to the method according to the invention. The preferred method features are also applicable to the computer-implemented method.

It is noted that the description in the Background section is not necessarily admitted prior art to the instant invention.

BRIEF DESCRIPTION OF THE DRAWINGS

Various aspects and embodiments of the invention will be explained in further detail below, making reference to the accompanying drawings. They show.

DETAILED DESCRIPTION OF THE INVENTION

FIGS. 1a to 2b have already been discussed in further detail at the outset of the description of the prior art, for which reason at this point a further description of the figures will be omitted.

Figure 3:
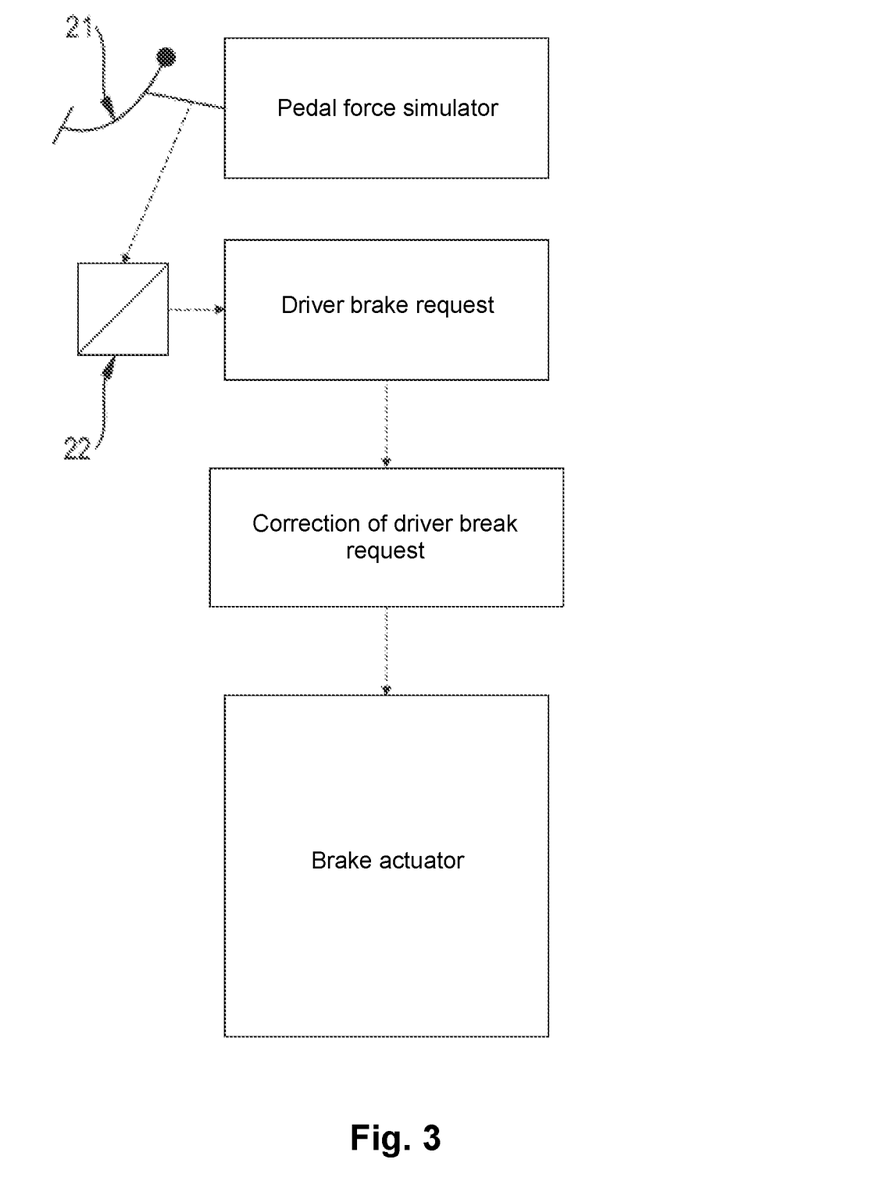
FIG. 3 a representation of the procedure of the method according to aspects of the invention.

FIG. 3 shows a flow chart of an embodiment of the method according to the invention. By actuating a brake pedal 21, the driver can relay a brake request to the brake system. A pedal force simulator influences the pedal force to be applied by the driver to move the brake pedal 21 by a determined pedal stroke. The relationship between the pedal force with which the brake pedal 21 is actuated and the pedal stroke traversed by the pedal is determined by a characteristic curve between the two sizes. The characteristic curve is intended to provide the driver with the feeling of a conventional brake system as far as possible. Thus, a characteristic curve of the pedal force simulator substantially corresponds to the characteristic curve of a conventional system as shown in FIG. 1B. As the pedal stroke increases, there is a greater amount of pedaling effort required to further move the brake pedal 21.

A pedal sensor 22 senses the pedal stroke traveled by the pedal sensor when the brake pedal 21 is actuated. Based on a second characteristic curve, as depicted for example in FIG. 1a, this pedal stroke is translated into a driver brake request. In conventional brake systems, this driver brake request also does not increase linearly with the pedal stroke, but initially increases slightly, whereas with a large pedal stroke even a slight increase in the pedal stroke leads to a significant increase in the driver brake request (cf. embodiments of FIG. 1a).

According to the invention, after the detection of the driver brake request, the driver brake request is corrected if the detected driver brake request triggers an ABS braking. Then, based on the corrected driver brake request, a corresponding brake pressure is built up in at least one brake actuator (brake device) of the vehicle in order to achieve a braking effect. The correction of the driver brake request, and when this occurs, is discussed in further detail in FIGS. 4a and 4b below.

Figure 4A:
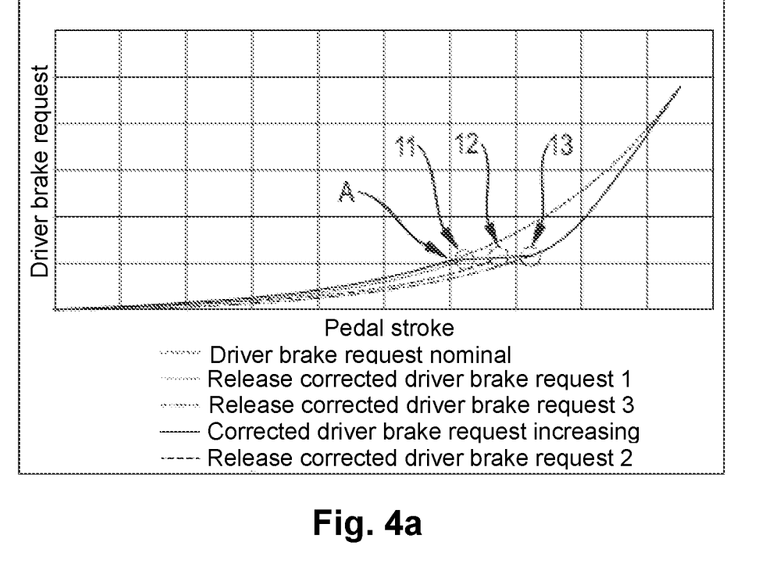
FIG. 4a a diagram illustrating a characteristic curve between the driver brake request and the pedal stroke in a brake-by-wire brake system using the method according to the invention.

FIG. 4a shows a diagram depicting a connection between the driver brake request (y-axis) and the pedal stroke (x-axis) using the method according to the invention. The middle dashed line represents a nominal driver brake request, i.e., the stored characteristic curve between the driver brake request and the pedal stroke. This relationship corresponds to the characteristic curve of a conventional brake system, as also shown in FIG. 1a, for example. The sensed driver brake request is thus always formed by a stored characteristic curve. The sensed driver brake request thus corresponds to the nominal driver brake request. The solid line represents the corrected driver brake request as long as the driver brake request is increased. Trigger point A marks the use of ABS braking by the brake system. If a driver activates the brake pedal 21 to brake the vehicle, the corrected driver brake request initially follows the nominal driver brake request, i.e., the stored characteristic curve, up to trigger point A. From trigger point A, the corrected driver brake request is corrected, in the embodiment shown, in such a way that it does not increase, or at least increases very slightly, beyond the sensed driver brake request at trigger point A. This results in an ABS plateau within which, despite the increasing pedal stroke, no significant increase in the corrected driver brake request can be found. If the end of the ABS plateau is reached and the pedal stroke is increased in addition, the corrected driver brake request approaches the nominal driver brake request again, i.e., the stored characteristic curve, until it again corresponds to the maximum nominal driver brake request with a maximum pedal stroke.

Figure 2A:
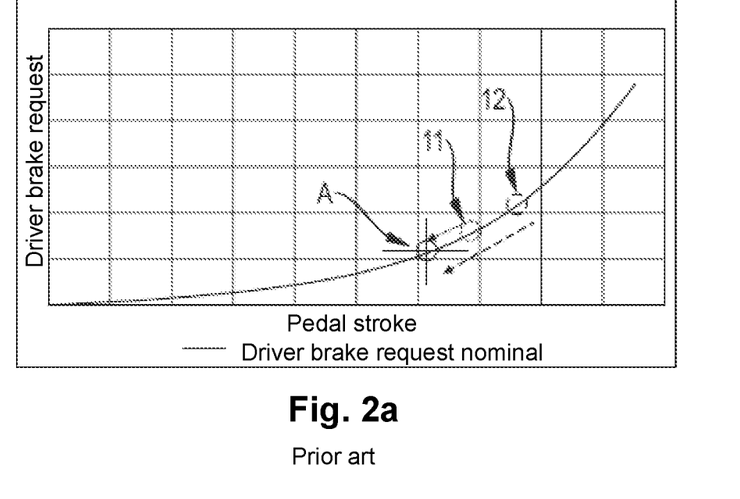
FIG. 2a a diagram illustrating a characteristic curve between the driver brake request and the pedal stroke in a brake-by-wire brake system using a method according to the prior art.
Figure 2B:
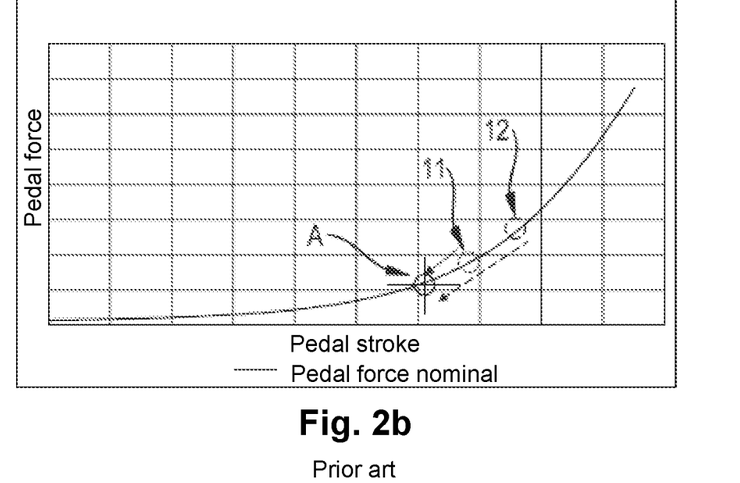
FIG. 2b a diagram illustrating a characteristic curve between the pedal force and the pedal stroke in a brake-by-wire brake system using a method according to the prior art.

In the diagram of FIG. 4a, three pedal positions 11, 12, 13 are drawn. These mark exemplary positions where the driver does not push the brake pedal further, i.e., the brake pedal stroke is not increased further by the driver. The achievement of only a certain pedal position can be justified, for example, by the driver not wanting to delay as much as possible or already knowing approximately when an ABS braking will be used in the prevailing conditions, or that the driver has already been notified that an ABS braking is present on the basis of various feedback systems (haptically, optically, acoustically), for which reason the driver does not specify a further increase in the driver brake request. If the driver then decreases the pedal stroke again, the nominal characteristic curve of the brake system is shifted to the position where the driver decreases the pedal stroke again. Shifting the characteristic curve can therefore be understood as meaning that the reduction of the corrected driver brake request is carried out to the same extent as the reduction of the driver brake request would occur starting from the trigger point A. Thus, unlike what is shown in FIG. 2a, a reduction of the driver brake request to a level, which is just short a triggering of an ABS braking, follows directly at this point. The sensed driver brake request is thus corrected so that it decreases directly when the pedal stroke is reduced, i.e., when the brake is at least partially released, namely starting from the sensed driver brake request at trigger point A of the ABS braking, so that there is no more ABS braking.

It can thus be achieved that no matter how far the driver has "passed" the trigger point, i.e., regardless of whether pedal position 11, 12, or 13 is reached, releasing the brake or brake pedal 21 directly results in braking just below the ABS braking. A sensitive release of the brake is thus carried out independently of the pedal position by the same reduction of the pedal stroke. Thus, the driver can easily find the trigger point A and modulate his driver brake request just below this trigger point A, as is also possible with a conventional brake system.

The different shifts of the characteristic curve are represented by the different lines, starting from the pedal positions 11, 12, 13. The weakly dashed line ("Release corrected driver brake request 1") belongs to pedal position 11, the strongly dashed line ("Release corrected driver brake request 2") belongs to pedal position 12, and the dotted line ("Release corrected driver brake request 3") belongs to pedal position 13. Each of these three lines ends at the zero position of the pedal stroke, i.e., at the initial position of the brake pedal without any force from the driver, at the nominal characteristic curve of the sensed driver brake request. Once the pedal 21 is fully released and returned to zero, the nominal characteristic curve for braking is again applied. As long as the brake pedal 21 is not brought to zero, the sensed driver brake request is corrected based on the shift of the characteristic curve.

The length and the slope of the ABS plateau as well as the points at which the characteristic curves of a corrected driver brake request and the nominal driver brake request meet again can be designed to be adjustable. Embodiments are also contemplated in which no ABS plateau occurs in the corrected driver brake request in an ABS braking. In these embodiments, the corrected driver brake request always follows the nominal driver brake request of the characteristic curve. If the sensed driver brake request is reduced, however, the same correction takes place as already stated above. The corrected driver brake request jumps to a level shortly below the trigger point A of the ABS braking when the braking is released. In the depicted diagram, it thus falls directly perpendicularly downward from a point on the characteristic curve of the nominal, i.e., sensed driver brake request until it has reached the value of the sensed driver brake request just before trigger point A. The reduction of the corrected driver request is then carried out as in the embodiment described above, wherein the characteristic curve of the nominal driver brake request is shifted to the corresponding pedal position 11, 12, 13 of the release.

Figure 4B:
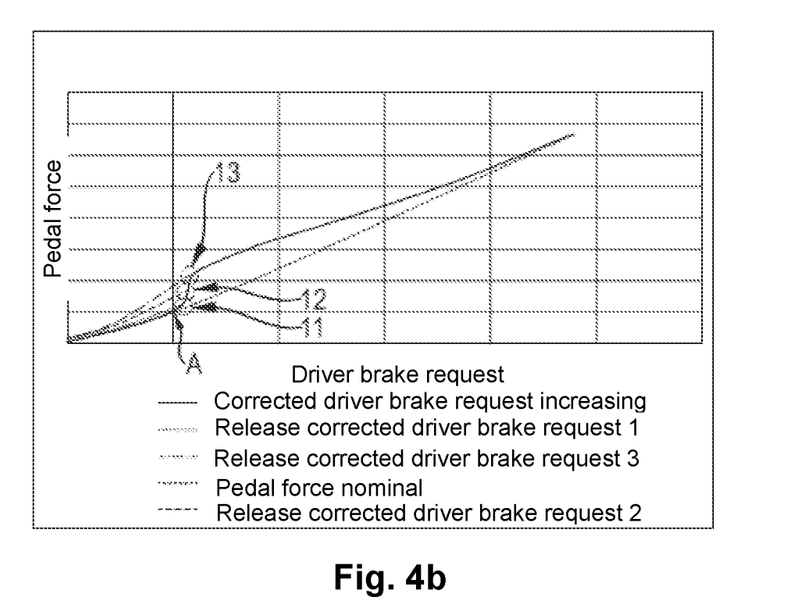
FIG. 4b a diagram illustrating a characteristic curve between the pedal force and the pedal stroke in a brake-by-wire brake system using the method according to the invention.

FIG. 4b shows a diagram indicative of a relationship between the pedal force (y-axis) and the driver brake request (x-axis) using the method according to the invention. The pedal positions 11, 12, 13, as well as the corresponding lines of the corrected driver brake desire or the nominal driver brake request correspond to the positions and lines of FIG. 4a, for which reason this is not discussed in further detail again.

Here, it can be seen that an ABS plateau is also formed, as in the embodiment described in FIG. 2a, wherein this plateau extends perpendicularly, unlike the plateau shown in FIG. 4a. Thus, by correcting the driver brake request with increasing pedal force, no increase in the driver brake request is relayed to the brake system. This also corresponds to the system functionality of a conventional brake system, in which, on a system basis, an increase in the pedal force due to the non-increasable pedal stroke did not lead to an increased delay due to the ABS braking (see FIG. 1B).

What is claimed is:

1. A method for optimizing meterability of brake force in ABS braking with a brake-by-wire brake system, said method comprising the steps of:
   sensing a driver brake request by way of a pedal force simulator,
   identifying a trigger point (A) of the ABS braking,
   correcting the sensed driver brake request such that, upon identifying the trigger point (A) during a reduction of the sensed driver brake request, the corrected driver brake request is reduced to an extent that ABS braking is no longer present, and
   implementing the corrected driver brake request by building up a corresponding brake pressure in a brake device of the brake system.

2. The method according to claim 1, wherein the correction of the sensed driver brake request is carried out such that, after identifying the trigger point (A), the corrected driver brake request is not increased via the sensed driver brake request at the trigger point (A).

3. The method according to claim 2, wherein the correction of the sensed driver brake request is carried out such that, after sensing a certain limit pedal stroke, a difference between the corrected driver brake request and the sensed driver brake request decreases.

4. The method according to claim 2, wherein the correction of the sensed driver brake request is carried out such that, after a certain difference between the sensed and corrected driver brake request, the corrected driver brake request is formed such that the difference between the corrected driver brake request and the sensed driver brake request is reduced.

5. The method according to claim 1, wherein the reduction of the corrected driver brake request is carried out to a same extent as the reduction of the driver brake request, starting from the trigger point (A).

6. The method according to claim 1, wherein, in a sensed maximum pedal stroke, the corrected driver brake request corresponds to the sensed driver brake request.

7. The method according to claim 1, wherein, after identifying the trigger point (A), the brake pedal is vibrated by way of a dedicated mechanical actuator.

8. The method according to claim 1, wherein, after identifying the trigger point (A), an optical and/or audible and/or haptic feedback is provided to a driver.

9. The method according to claim 1, wherein the sensing of the driver brake request is carried out by measuring a pedal force and/or a pedal stroke and/or a pedal angle.

10. A computer-implemented method for optimizing meterability of brake force in ABS braking with a brake-by-wire brake system, comprising the method steps according to claim 1.

* * * * *